INVENTOR
CLIFFORD A. BICKEL
BY
Toulmin & Toulmin
ATTORNEYS

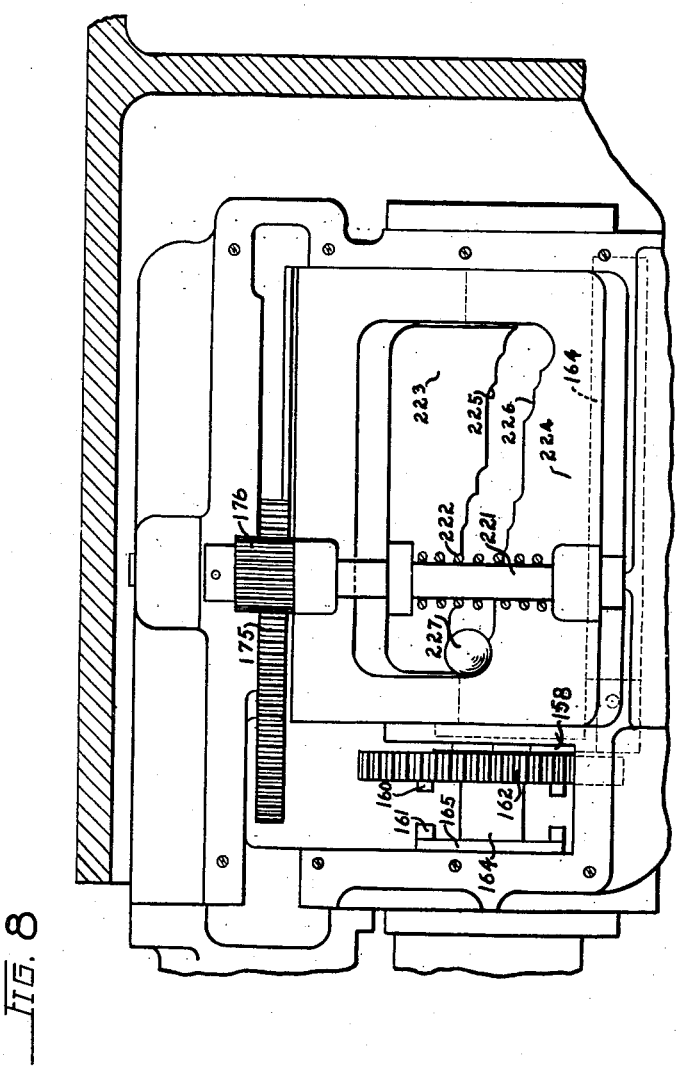

Patented June 5, 1945

2,377,305

UNITED STATES PATENT OFFICE 2,377,305

GEAR CHANGE MECHANISM FOR LATHES

Clifford A. Bickel, Sidney, Ohio, assignor to The Monarch Machine Tool Company, Sidney, Ohio, a corporation of Ohio Original application October 31, 1939, Serial No. 302,194. Divided and this application January 9, 1943, Serial No. 471,818

11 Claims. (Cl. 74—348)

This invention relates to machine tools, and particularly to lathes.

It is an object of this invention to provide a side range of threads and feeds through a quick changing gear box which can be operated by one hand.

It is another object of this invention to provide an endless belt automatically used for all feeds from the spindle to the gear box, by reserving and preserving the actuating gear train solely for thread chasing.

It is another object of the invention to provide a common drive means for both the lead screw and the feed rod of the lathe with means for selectively changing the speed of driving and of selectively rendering a portion of the driving mechanism for the lead screw inoperative during the period that the feed rod is being actuated.

It is an object of the invention to provide a lathe in which the operator can select any desired thread and feed either in a forward or reverse direction.

It is a further object of this invention to provide a gear box in which there is a separate feed rod and lead screw thread chasing means, and means to select the drive for the lead screw chasing means and the feed rod, together with a novel means of actuating a gear tumbler and selective gearing associated therewith.

It is an object of the invention to provide in this gear box means of selecting a drive either through the lead screw for chasing screws or through the feed rod for actuating the carriage in its longitudinal movement.

It is a further object to provide in this gear box means for selecting the thread that is to be chased and the thread range according to a dial and the selective mechanism associated therewith on the front of the lathe.

It is a further object to provide in this gear box common gearing for varying the speed of both the lead screw and the feed rod and of selectively selecting the drive for said lead screw and feed rod from two lines of power mechanism driven from a common power source.

It is a further object to provide means of providing a self-driven power for the feed rod which need not be as accurate in its driving as the lead screw and a separate power source through multiplying gears comprising a direct drive in order to insure extreme accuracy in the actuation of the lead screw for thread chasing.

It is a further object by this selective mechanism for rendering the driving gear through the lead screw inoperative during the period that the feed rod is being actuated in order to eliminate the noise and wear upon the driving gears for the lead screw during the period the feed rod only is being actuated.

It is another object of the invention to provide an improved gear box having an improved mechanism for locking an idler tumbler gear in engagement with at least one set of speed selection gears, and for unlocking the idler tumbler gear to permit changing the same from one gear to another in the selective gear set.

Further object and advantages will become apparent from the drawings and the following description.

Referring to the drawings:

Figure 8 is a top plan view of a portion of the gear box mechanism with the lathe base partially in cross section, taken substantially along line 8—8 of Figure 4.

Figure 1:
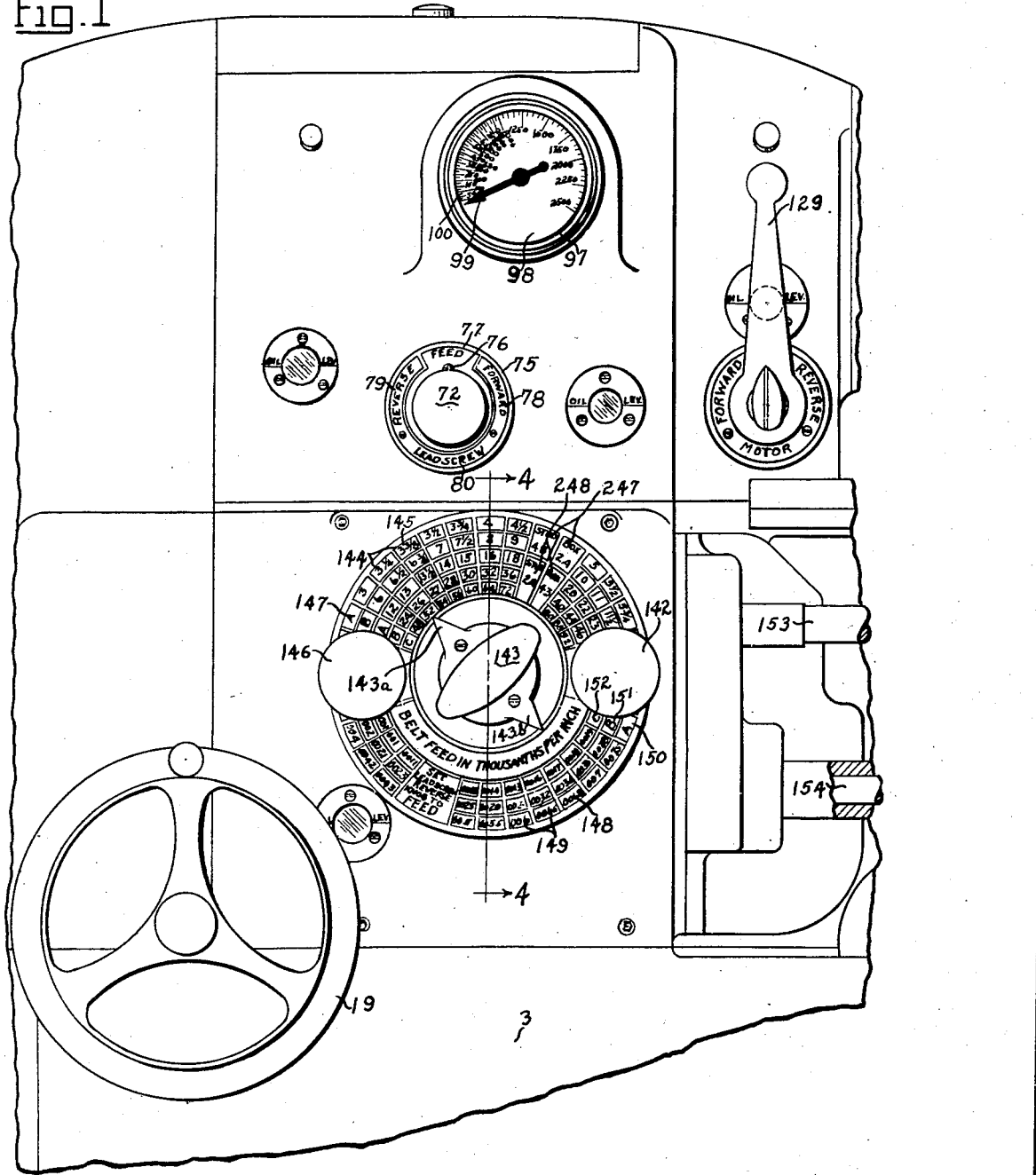
Figure 1 is a detailed front elevational view of the controls for the headstock spindle, and hydraulic change gearing, speed gear mechanism and the controls for the gear box.

In this invention the lathe base consists of a bottom wall 1, having feet 2, a front wall 3, and a rear wall 4, which provides an enlarged compartment to accommodate the driving motor, the hydraulic transmission and the hydraulic controls. Within the compartment 9 formed in the base there is mounted an electric motor 10, which rests upon an oil reservoir 11 within the compartment 9. The motor 10 drives a pulley 13 through means of a belt 12, the pulley 13 being mounted upon the drive shaft of the hydraulic power transmission unit 15. The adjustment of the hydraulic power transmission unit controls the speed of the output or driven shaft 16 from substantially 0 to 2500 R. P. M. or greater. This unit is controlled by means of a control mechanism provided in the control box 17, which, in turn, is actuated by a flexible shaft 18 connected to the hand wheel 19 on the front of the lathe.

Rotation of the hand wheel 19 therefore varies the speed of the driven shaft 16 upon which there is mounted a pulley 20. A belt 22 extends over the pulley 20 and engages a pulley 24 carried upon the spindle 28 of the lathe. The spindle 28, or the end thereof, is utilized as a pulley as at 29 for driving the belt 30 which, in turn, drives the pulley 31 on the shaft 32, which ultimately drives the feed rod of the lathe.

The headstock spindle 28, has gear and clutch mechanism associated therewith whereby the clutch may selectively engage the gear associated with the spindle 28 for selectively rotating the spindle in either a forward or reverse direction. The clutch associated with the spindle is actuated by means of a control rod that has a knurled head 72 by which the rod can be rotated to shift the clutch mechanism. A dial 75 is provided on the exterior of the headstock and a pointer 76, associated therewith that is mounted to turn with the knurled head 72. This dial 75 is arranged to indicate the feed position 77 for the feed rod during which the clutch for the spindle is in neutral; the forward position 78, and the reverse position 79 for the lead screw to provide for a right and left hand screw respectively by forward or reverse rotation of the spindle 28.

Figure 2:
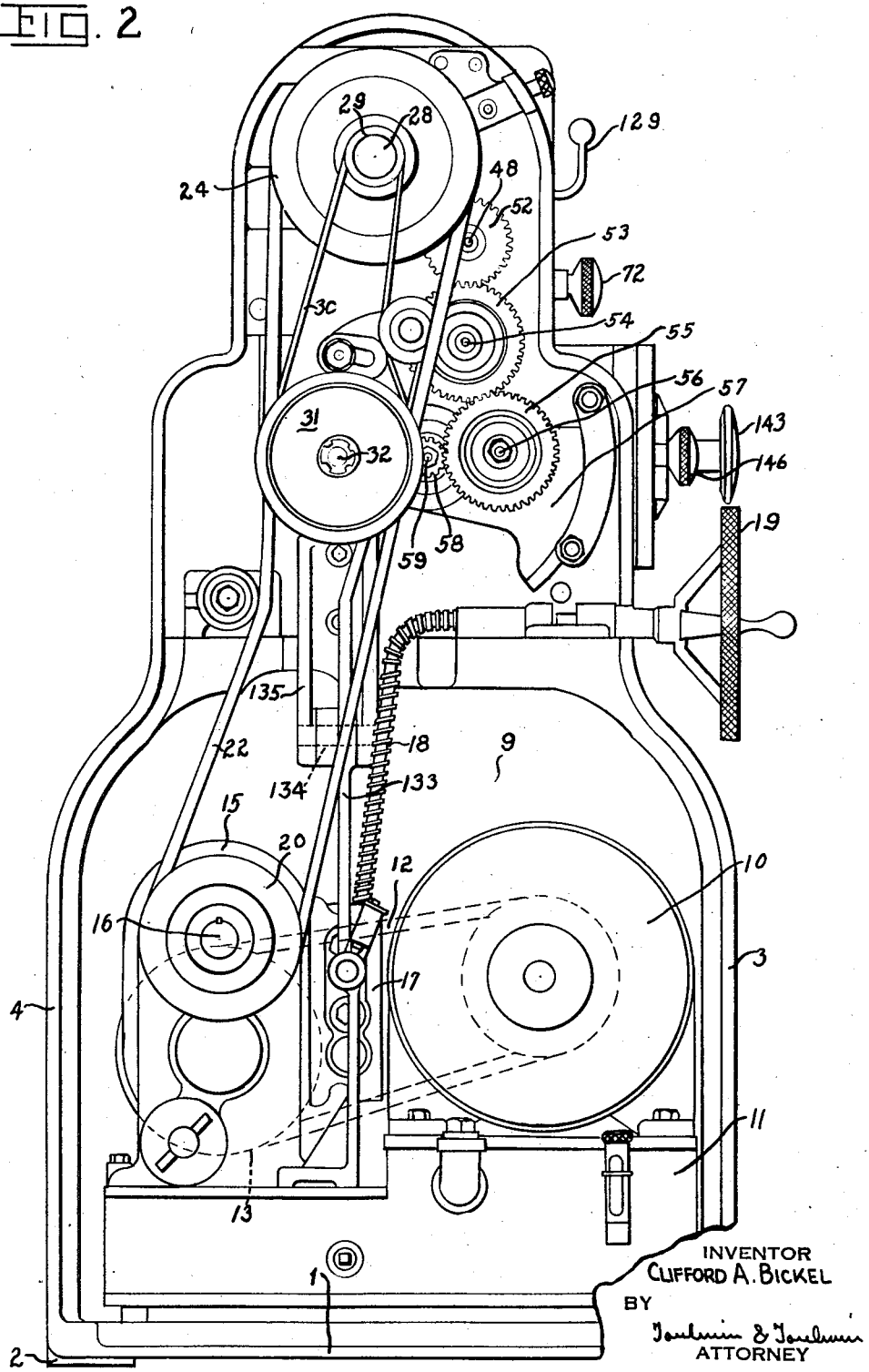
Figure 2 is an end elevational view of the lathe with the end cover removed showing the drive arrangement from the hydraulic change speed mechanism to the spindle and from the spindle to the feed rod and the lead screw.

The headstock houses a shaft 48 extending therefrom that is driven by the gear mechanism within the headstock and thus is controlled in forward or reverse rotation by the clutch associated with the spindle. This shaft 48 has a gear 52 secured on the end thereof, see Figure 2, that meshes with gear 53 which in turn meshes with a gear 55 for ultimately driving the pinion 58 mounted upon the end of the shaft 59 whereby the gear box mechanism is driven by this train of gears for providing a positive gear drive for the lead screw.

Referring now to the gear box, there is illustrated a mechanism for selecting the drives for chasing threads through the operation of the lead screw and for the actuation of the carriage and cross-slide through the feed rod. With the mechanism of this gear box the operator utilizes the knob 142 in order to actuate a clutch hereinafter described so as to select either the lead screw or the feed rod to be driven. Thereafter he operates the quick change thread index knob or handle 143 with pointer 143b to selectively position the gearing in the gear box in order to change speeds, when that is desirable in connection with the operation of the feed rod. However, if the lead screw has been selected to be driven, then button 146 is used for the purpose of selecting the thread indicated in any one of the radial columns 144 of the dial plate 145 on the upper half of the dial. Also, in the event of using the lead screw, button number 146 is used for the purpose of selecting the thread range of the thread to be chased, which range is indicated in any one of the concentric columns "A," "B," or "C" indicated at 147.

It will be understood that, as heretofore described, the belt 30 driven by the spindle 28 through the sleeve 29 actuates the feed rod through the pulley 31. This is the belt driven power source for the feed rod which does not need to be as accurate in its feeding as the feed of the lead screw. Similarly, the spindle 28 drives through the multiplying pick-off gears 52 to 58, providing a direct drive through gearing that is extremely accurate for actuating the lead screw. This also has the further advantage that the driving gears for the lead screw are not uselessly employed and worn when driving the feed rod.

By actuating the knob 143 and moving its pointer 143b over the lower half of the dial, the speed of the belt feed can be selectively determined by selectively positioning the gearing hereinafter described in order to change the gearing speeds. The lower half of the dial for this purpose is designated 148. It is provided with radial columns 149 and concentric columns 150, 151 and 152.

This lead screw is designated 153 and the feed rod 154.

The actuation of the knurled knob 142 clockwise (if viewed from the position of Figure 3, but counter-clockwise if viewed from the position of the operator of the lathe) results in selecting the lead screw through which the carriage will be driven so as to feed the carriage to chase threads. This is effected through the shaft 155 which has the elongated pinion 156 engaging with the circular rack 157. The actuation of this circular rack results in moving the shifter fork 158 actuating the clutch member 159 so as to bring the clutch teeth 160 and 161 into engagement with one another, thereby bringing into operation the drive through the gears 52 to 58, the latter being on shaft 59.

The gear 162 has formed with it and as a part of it the annular shoulders 159a, the space between which forms a groove for the reception of the shifter fork 158. The drive from pulley 31 through shaft 32 and gear 163 to gear 162 imparts motion to the shaft 164 because the gear 162 is splined thereto. This gear 162 can slide longitudinally of the shaft 164 but must rotate with it. When it is moved to the left (Figure 5), the teeth 160 engaging with the teeth 161 of the clutch member 165 thereby connect the shaft 164 to the drive through gear 58 which is connected to the shaft 59 on which the clutch member 165 is mounted. In this manner the drive through the gearing from 52 to 58 drives the shaft 59 and the shaft 164, in turn actuating the elongated pinion 166.

The right-hand end of this pinion is mounted in a ball bearing 167 that is carried within the enlarged end of a sleeve 168 cutaway at 169 which surrounds the elongated pinion 166. This sleeve serves as a support for the tumbler arm 170 that slides thereon and pivots thereon. This tumbler arm 170 carries a cross pin 171 in ball bearings 172. Mounted on this pin through the medium of the ball bearings 172 is the tumbler gear 173. This gear is in constant mesh with the elongated pinion 166 through the cutaway portion 169 of the sleeve 168. It is adapted to turn with the elongated pinion and to slide along the pinion. This gear 173 and the tumbler arm 170 are shifted back and forth by the shifter fork 174 which is connected to the rack 175, which in turn engages the pinion 176. I will return to a description of the operative mechanism embodying the quick change thread index handle 143 and the operation of the parts associated with it.

Figure 5:
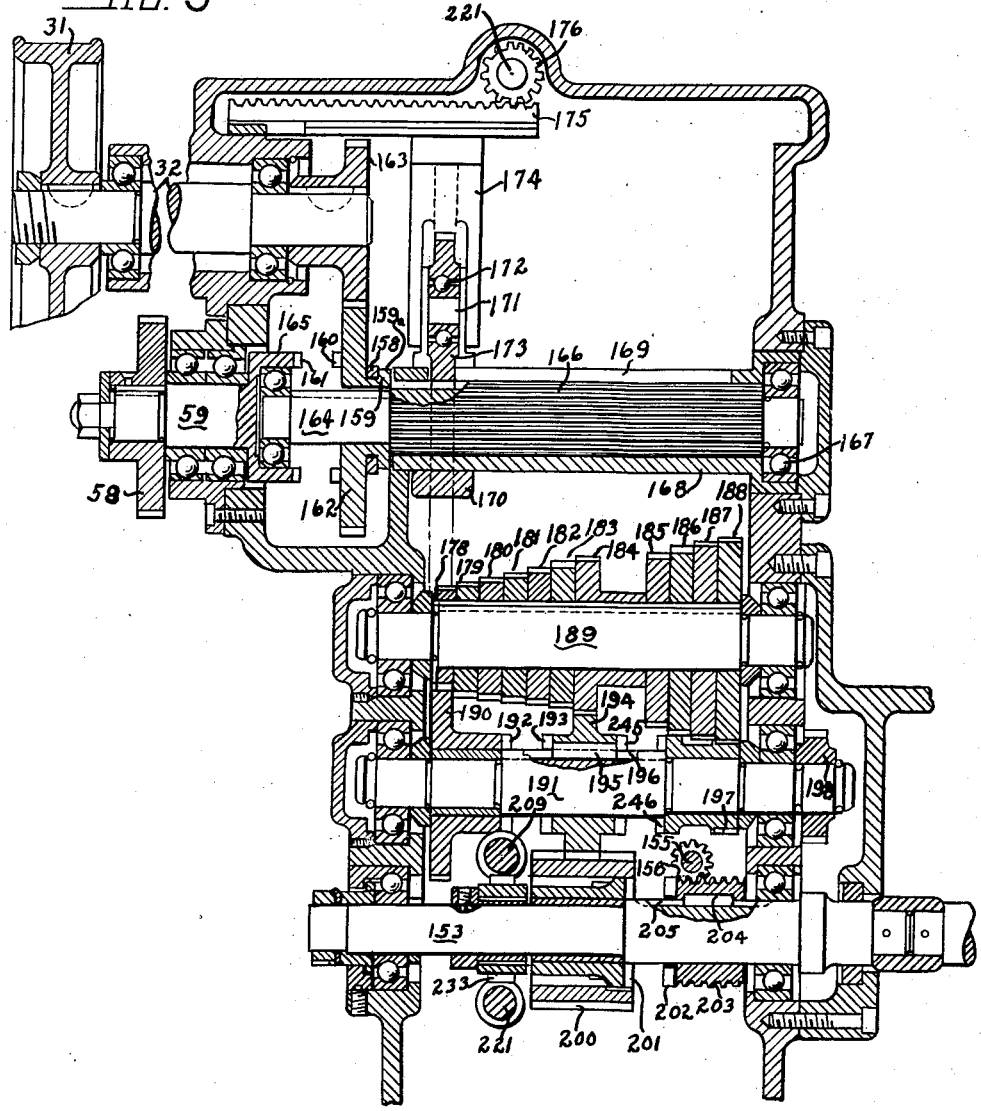
Figure 5 is a developed horizontal cross-sectional view of the gear box taken substantially along line 5—5 of Figure 4

Returning now to the elongated pinion 166 which is being driven by the shaft 164 through the gears 52 to 58 for the purpose of driving the lead screw for chasing threads, the gear 173, which is always in mesh with the elongated pinion 166 engages with one of the cone gears of the speed changing system designated 178. There are a series of such gears designated 178, 179, 180, 181, 182, 183, 184, 185, 186, 187, and 188. These gears turn with the shaft 189 to which they are affixed. The particular gear which gear 173 would engage of this series of change speed gears 178 to 187 depends upon the operation of the handle 143 which will be explained hereinafter. Assuming for the moment that it is in engagement, as shown in Figure 5, with gear 178, gear 190 is in engagement with gear 178. Gear 190 is freely mounted on shaft 191. The gear is also provided with a clutch tooth 192 that is adapted to engage with the clutch tooth 193 of gear 194 that is fixed to and turns with shaft 191 and is adapted to reciprocate thereon. This is arranged through the use of a key 195 operating in the spline way 196. On this shaft 191 is mounted freely the gear 197 which meshes with the gear 188. On the end of the shaft 191 is fixed the gear 198 that in turn meshes with the feed rod gear 199 that is mounted on the feed rod 154.

Returning to the gear 194, it will be observed that it is constantly in mesh with the elongated gear 200. This gear has a clutch tooth 201 adapted to engage with the clutch tooth 202 of the circular rack 203 which is mounted upon the lead screw 153, reciprocates on the lead screw, and turns with it due to the key 204 in the keyway 205. The gear 200, however, turns freely on the lead screw shaft 153.

Therefore, when the handle button 142 is turned to bring the gear drive into operation through closing the clutch members 160 and 161, as heretofore described, the rotation of the shaft 155 will bring the circular rack 203 into clutching engagement with the gear 200 so that the lead screw is driven. It will be noted that at this time the feed rod 154 is also being rotated by reason of its driving connection through gears 198 and 199 with the shaft 191. Normally, this rotation of the feed rod is not utilized; that is, when the operator has so set the gearing as to drive the lead screw, he utilizes the lead screw only for moving the carriage, and permits the feed rod to rotate idly. However, if he desires to operate the carriage or cross feed from the feed rod at a speed slower than could be obtained in the usual way, he may do so by setting the gearing for driving the lead screw as described above, and then taking the drive from the feed rod at the apron controls. This provides a coarser range of feeds, in addition to the feed range shown on the dial plate 148.

The speed of the driving gear 200, and consequently of the lead screw 153, is changed in two ways. The first way is to change the position, as hereinafter described, of gear 173 with respect to any one of the gears 178 to 187 inclusive. The result of changing the position of 173 with respect to the cone gears is to select any desired speed in the radial portions 144 of the dial 145. For instance, on the left-hand side of the upper portion of the dial, it is possible to select by this shifting of 173 any one of the radial positions 144, of which there are ten on the upper half of the dial. There are also ten on the lower half of the dial which likewise can be selected in connection with the feed rod drive hereinafter explained.

If, however, you wish to select a particular concentric range such as A, B, A, B, C in the column 147 on the upper part of the dial, then the manipulation of the range selector 146 to determine the number of threads per inch is effected.

Before proceeding with the description of this selector operation, the following is a description of how the gear 173 is moved from gear 178 to gear 187 or any intermediate gear.

The handle or knob 143 which is known as the "quick change thread index handle" is first pushed inwardly. This is accomplished, as will be seen from Figure 4, by having a sleeve 206 to which the handle 143 is attached. There is a slot 207 in this sleeve in which extends the cross pin 208 mounted on the end of the slide shaft 209. This movement is resisted by a helical spring 210 between a cam head 211 on the sleeve 206 and the gear 212. The purpose of this spring is to maintain the sleeve 206 normally in its outer position. However, when the handle 143 is positioned inwardly with the sleeve 206, the wall of the slot 207 engages the cross pin 208. The inward movement of the cam 211 actuates the cam follower head 213. This head 213 is on the arm 214 fixed to the arm 215 of a bellcrank pivoted at 216, the other arm of which lies behind the hub 218 of the gear 219 which is fastened by the pin 220 to the shaft 221.

Figure 3:
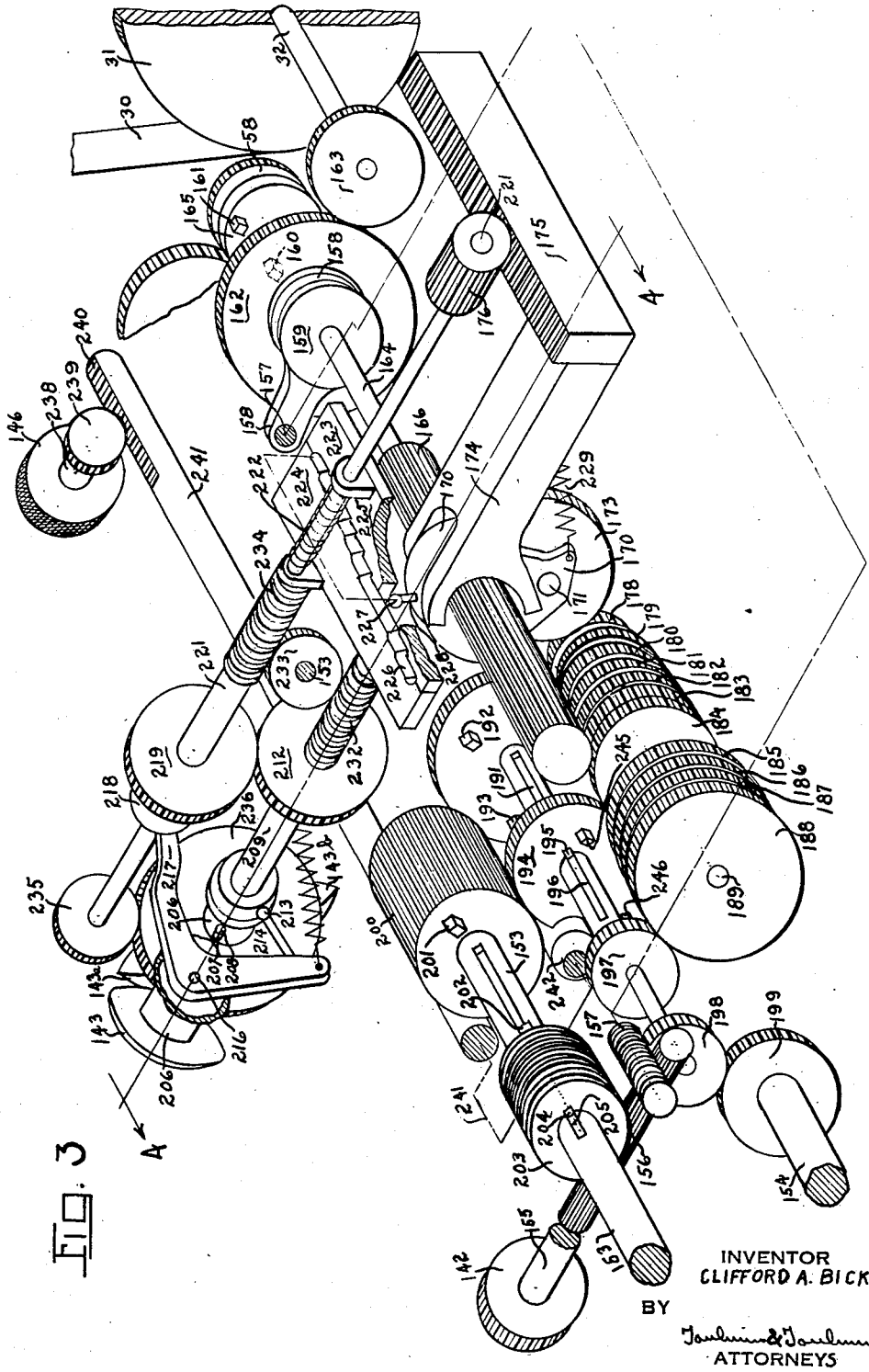
Figure 3 is a perspective elevational view, diagrammatically illustrating the arrangement of the gearing within the gear box and the controls for the same.
Figure 4:
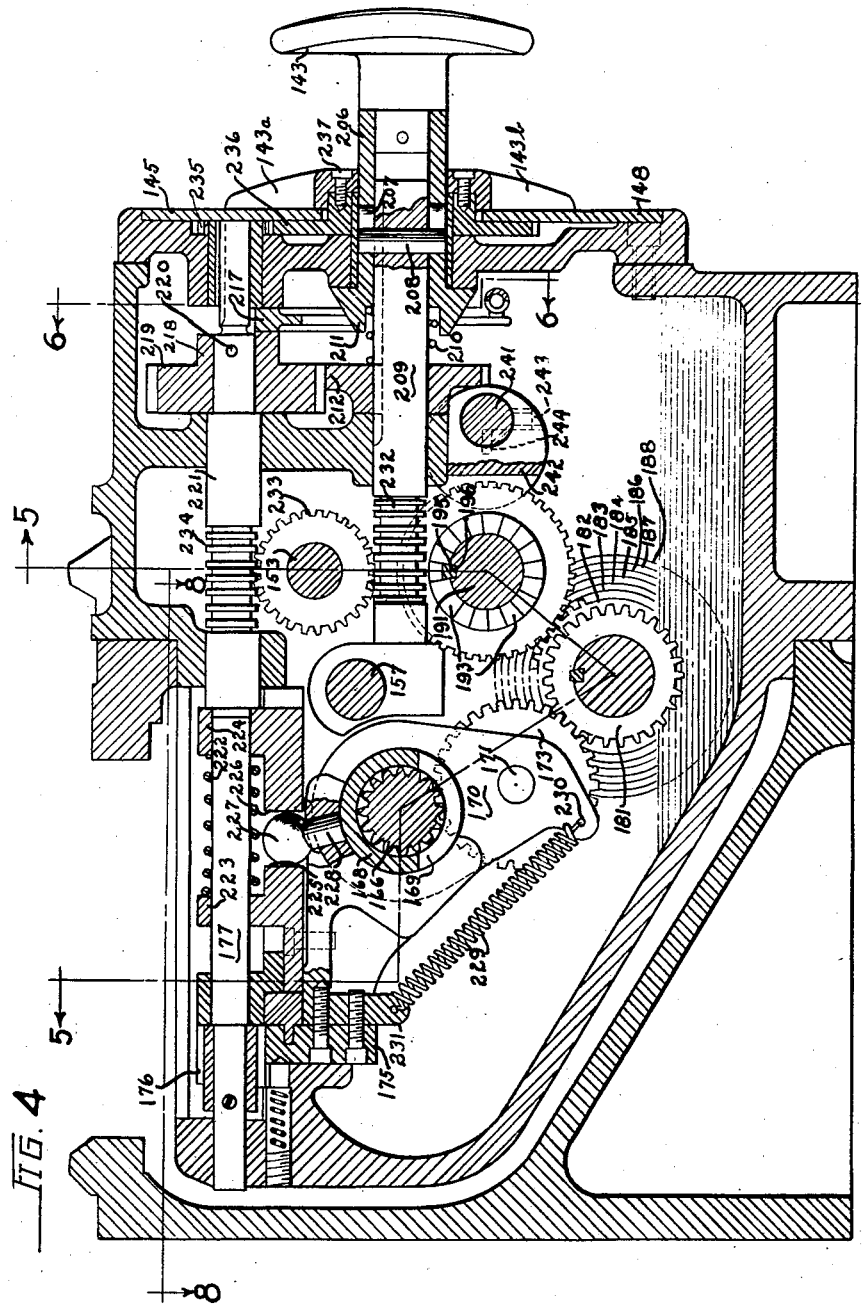
Figure 4 is a vertical cross-sectional view taken substantially along line 4—4 of Figures 1 and 3, showing the association of the several parts within the gear box.
Figure 6:
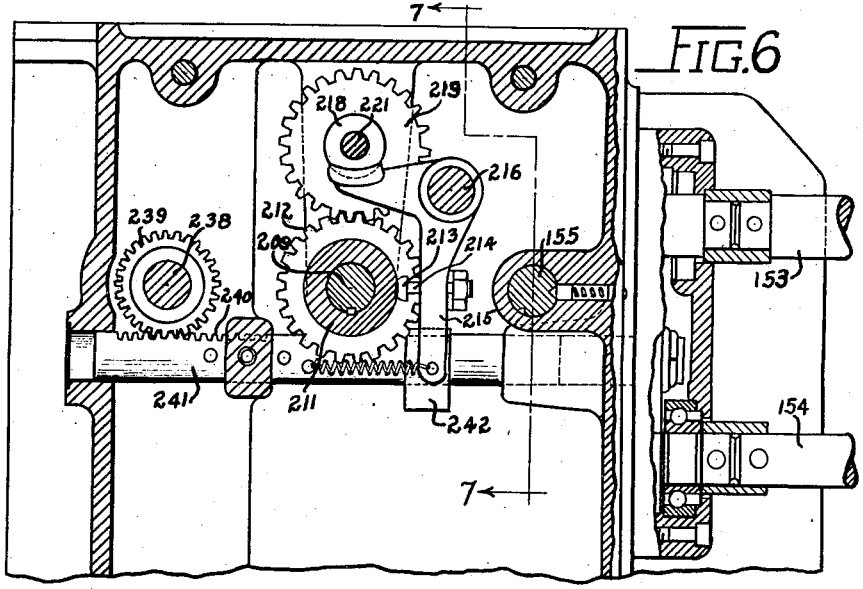
Figure 6 is a vertical cross-sectional view taken along line 6—6 of Figure 4.
Figure 7:
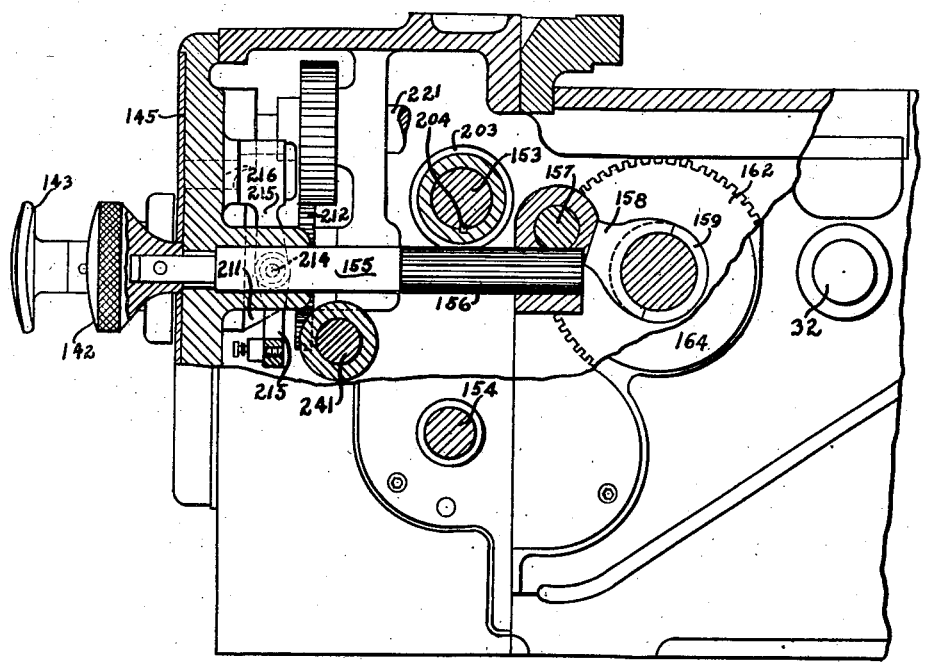
Figure 7 is a cross-sectional view taken along line 7—7 of Figure 6.

In operation, the arm 217 starts at a position against the end of the hub 218 as shown in Figures 4–6. The inward movement of the sleeve 206 depresses the arm 217, allowing the shaft 221 with gear 219 to shift that gear to the right hand. Now having permitted the gear 219 to move to the right hand under the influence of the helical spring 222 which surrounds the shaft 221 at its left hand end, the following operations take place. The spring 222 spreads the two halves of the tumbler positioning plates designated 223 and 224, which plates have cutaway cam faces (see Figures 3 and 8) and between which spaces generally designated 225 and 226 is the ball 227 on the pin 228, which pin 228 is mounted in the tumbler arm 170. The action of the spring 222 is to spread these halves of the tumbler cam plate 223 and 224, thereby permitting free movement on the part of the ball 227. It will be understood that the half 224 is free to move with respect to 223, which is anchored.

This permits the ball 227, pin 228 and tumbler arm 170 to rotate about the center of the gear 166 due to the pull of the spring 229, which is anchored at one end to the tumbler arm 170 at 230 and at the other end to a fixed abutment 231. The result of this is to carry the tumbler gear 173 which is pivotally mounted on the tumbler arm 170 away from the gear 178 or any other gear from 178 to 186 with which it might have happened to be in engagement.

Gear 173 is now free to be shifted laterally for engagement with a new change speed gear. To do this the handle 143 is turned to rotate the sleeve 206 and the shaft 209. This results in rotating the gear 212 which is fixed to the shaft 209. The gear 212 is in mesh with the gear 219 that is fixed to the shaft 221. On this shaft 221 is the pinion 176 which engages with the rack 175 on which is carried the shifter fork 174. The rotation of the shaft 221, therefore, results in the lateral movement of the shifter fork 174 which carries with it the disengaged gear 173 to a new change speed gear engaging position.

The gear 173 now being in its new position opposite the desired change speed gear, the handle 143 is pulled out in order to push the gear 173 into engagement with one of the gears 178 to 187 that is selected. This is accomplished by having a circular rack 232 on the shaft 209 engaging with a pinion 233 which is freely mounted on the lead screw 153, which merely serves as a carrier of convenience. This gear 233 in turn engages the circular rack 234 on the shaft 221, thereby pushing it to the left-hand (see Figure 4) against the spring 222. This gear 173 is now engaged with the desired change speed gear. Another result of pulling the handle 143 out is to restore the lever of the bellcrank marked 217 into its uppermost position, as shown in Figure 4, because at this time the outward pull has restored the gear 219 and the cam 211 to the position shown in Figure 4.

When the handle 143 was rotated, as heretofore described, this rotated the shaft 221, on the forward end of which in the right hand of Figure 4 is the gear 235 which meshes with the gear 236 that is fixed by the bolts 237 to the pointers 143a and 143b, so that the pointers would be rotated at a proportionate speed and distance necessary to indicate the desired reading, indicating what had been done as a result of the movement imparted to the mechanism.

We now pass to the description of the operation and mechanism for the range selector to determine the number of threads per inch that will be chased as a result of the operation of the lead screw. This is also employed in connection with the feed rod, but that will be covered by a later explanation.

Turning to Figure 1 and the upper half of the dial 145, the handle 146 is used for positioning the mechanism in order to select which one of the concentric areas A, B, A, B, C, it is desired to select, as each of those ranges will determine the number of threads turned per inch of the work.

The operator rotates the handle or knurled button 148 which is mounted on the shaft 238, on the end of which is carried a pinion 239 engaging with a rack 240 on the rod 241. This rod is connected to the shifter fork 242 by a set screw 243 and a key 244 engaging in co-operative keyways the shaft 241 and the shifter fork 242. The arms of this fork engage with the sides of the gear 194 for moving it so that it either clutches the gear 190 through the clutch teeth 192 and 193 or it is moved in the opposite direction to engage the gear 197 through the clutch teeth 245 and 246. If the handle 146 is turned clockwise, as viewed from the outside of the machine, the gear 194 will be clutched to the gear 190. This results in the selection of the C range on the dial 145. If the gear 194 is left in unclutched position and also in mesh with gear 184, then the inner range B is selected on the dial 145. If the gear 194 is clutched by a reverse movement of the handle 146 to the gear 197, then the range of the innermost A range on the dial is secured. The outer ranges A and B on the dial are selected in the same manner but only when the gears 58 and 52 have been exchanged, taking each other's places and thereby changing the gear ratios.

As indicating what to do in this connection of shifting the gear 52 from the stud position to the box position of gear 58 (see Figure 1), the dial provides the spaces 247 and 248. If you desire to operate within any one of the inner ranges, reading from the center of the dial C, B, A, then you put the gear 52 in the stud position and the gear 58 in the box position as indicated at 248 on the dial. The numeral 24 under the work "stud" refers to the number of teeth on the gear 52 and the numeral 48 under the work "box" refers to the number of teeth on the gear 58. However, if you wish to select the outer ranges A and B on the dial, then you move the 24-toothed gear 52 to the box position where gear 58 is located and then move the gear 58 with its 48 teeth into the stud position formerly occupied by gear 52. In the stud position the gear is mounted on shaft 48 and in the box position it is mounted on the shaft 59. The reason that the stud and box space is placed where it is on the dial 145 is because such a space occurs between the change speed gears 184 and 185.

We now turn to a description of the change speed gear mechanism as operated in connection with the drive of the feed rod and also a description of the range selector as indicated in connection with the feed rod, which positions and feeds are indicated on the lower half of the dial marked 148.

The operator grasps the handle or knurled knob 142, turning it clockwise as he stands in front of the machine or counter-clockwise as viewed in Figure 22. The purpose of this is to rotate the shaft 155, move the rack 157, actuate the shifter fork 158 and de-clutch the gear 162 from the driving gear 58, placing the gear 162 in mesh with the belt driven gear 163. The train of gears 52 to 58 and also the headstock gearing are thus rendered inoperative to drive the lead screw. The complete stopping of these gears is accomplished by moving the button 72 until the pointer 75 is opposite the space marked "feed." This effects movement of the clutch in spindle head to its intermediate position and breaking the driving connection between the spindle 28 and the gears 52, 53, 55, and 58. This saves wear upon them, the noise of operating them, and the vibration from the momentum of the mass of these gears travelling at speeds as high as 2500 R. P. M.

The result of connecting gear 163 and 162 is to drive shaft 164 from the belt 30, which in turn drives the elongated gear 166 that is in mesh with tumbler gear 173, that in turn is engaged with any one of the gears 178 to 187 as heretofore described. It will be noted that the same change speed gear mechanism is utilized for the feed rod as for the lead screw.

Likewise the same range selector 146 is utilized for shifting the gear 194. The gear 194, in its intermediate position as shown in Figure 3, is in engagement with gear 184 which is driven through gear 173 and any one of the change speed gears except 188. In the event that the gear 194 is shifted out of engagement with gear 184, then the drive from 173 is through the shaft 189 and the gear 188 affixed to it and thence to the gear 197 in mesh with it, whence the shaft 191 is driven and the gear 198 meshing with the gear 199 on the feed rod 154 drives the feed rod.

On the other hand, if the gear 194 is out of engagement with the gear 184 and has been moved into clutching position with the gear 190, the drive to the shaft 191 will be through gear 173, shaft 189, gears 178 and 190, shaft 191, gear 198, gear 199, and feed rod 154.

The ratio of gears 190, 194, 197 is in proportion of four, two, and one. This geometric progression is indicated on the upper half of the dial 145 as to the progression between the figures in the different ranges read radially. This also is true of the lower half of the dial 148. The three ranges C, B, and A are selected, as heretofore described, with respect to the upper half of the dial on the three inner ranges. When gear 194 is in engagement with gear 190, the parts are in the inner C (152) range. When the gear 194 is in its intermediate position, as shown in Figure 3, it is in the B (151) range. When gear 194 is declutched with gear 197, then A (150) range is utilized.

The selection of the radial group of figures on the dial is effected by placing the pointer 143b opposite the radial portion of the dial indicated for any radial portion by the numeral 149. This is effected by moving the handle 143. This indicates the speed selection for any given range. When the lower half of the dial is to be utilized, the operator must set the knob 72 known as the "lead screw reverse knob" so that the pointer 75 is in the feed position, which means that the gears 52 to 58 and the associated headstock gears are rendered inoperative because the clutch therein is placed in neutral position in the headstock gearing. The space on the dial 148 in which this legend "set lead screw reverse knob to feed" occurs is due to the space between gears 184 and 185. As indicated on the dial half 148, the belt feed is indicated by the numerals on the upper half of the dial indicate the number of threads per inch that are chased on the work.

*Summary of operation*

The direction of the drive of the motor is determined by the position of the lever 129 that controls the hydraulic transmission 15 through the control box 17. The speed of the shaft 16, which is a driven shaft on the output side of the hydraulic unit 15, is controlled by the hand wheel 19.

The headstock gearing is controlled by the handle 72. If it is placed with the pointer 76 opposite the "feed" at 77, then the drive is to the feed rod through the belt 30 which may be driven either forwardly or reversely, depending upon whether the handle 129 is thrown toward the "forward" or "reverse" position on its dial. If the handle 72 is turned with the pointer 76 towards either position 78 or position 79 of the "lead screw" dial 80, then the lead screw driving gears 52, 53, etc., are rendered operative.

If the feed rod is to be actuated, then the handle 142 is moved as described to open the clutch members 160 and 161 to disconnect the lead screw driving gears 52 to 58 at the driven end of those gears, the driving end already having been disconnected by moving the button 72 so that the pointer points towards "feed" at 77. The handle 143 is then moved so that the pointer 143b points to the particular part of the dial indicating the belt feed in thousandths per inch desired, that is, it is turned to select the particular change speed gear 178 to 187 with which the tumbler idler gear 173 is to engage. The handle 146 is moved as a range selector to actuate the range selector gear 194 so that any one of the ranges "A," "B," or "C" at 150, 151 or 152 can be selected. Therefore, the speed, range and direction of feed of the feed rod is controlled.

On the other hand, if the lead screw is to be actuated, the handle 72 is moved to point to the lead screw at either 78 or 79, and the handle 142 is moved to connect the clutch 160—161 to connect the driving gears 52 to 58 to the shaft 164, the gear 52 having been connected by the movement of the handle 72 to the driving spindle 28 through the headstock gearing. The handle 143 is moved so that its pointer 143a selects the change speed gear 178 to 187 to be engaged by the tumbler idler gear 173 in order to determine the speed of the lead screw in the chasing of threads. The handle 146 is moved to actuate the range selector gear 194 to move it to the selected range "A," "B," "A," "B," or "C" as heretofore described.

This application is a divisional application of my copending application for Sensitive precision lathe, Serial 302,194, filed October 31, 1939.

While the form of the apparatus disclosed and described herein constitutes a preferred form, yet it is to be understood that the apparatus is capable of substantial alteration, and that all such modifications as fall within the scope of the appended claims are intended to be included herein.

Having thus fully described my invention, what I claim as new and desire to secure by Letters Patent is:

1. In a lathe change speed gear box, the combination of an actuating shaft adapted to be reciprocated and rotated, change speed gearing, a tumbler idler gear, a driven tumbler gear constantly in engagement therewith, means to pivotally support said tumbler idler gear to permit it to rotate while moving bodily around said tumbler gear and laterally thereof while in mesh therewith, locking means for said tumbler idler gear to lock it in its rotative position and lateral position on said tumbler gear, means actuated by the inward movement of said actuating shaft for unlocking said locking means, said locking means having cam surfaces for moving said tumbler idler gear rotatably about the tumbler gear as it is shifted laterally thereon, means controlled by the rotation of said actuating shaft for effecting said lateral shift of the tumbler idler gear, and means retaining said locking means in its unlocked position during said lateral shift of the tumbler idler gear.

2. In a lathe change speed gear box, the combination of an actuating shaft adapted to be reciprocated and rotated, change speed gearing, a tumbler idler gear, a driven tumbler gear constantly in engagement therewith, means to pivotally support said tumbler idler gear to permit it to rotate while moving bodily around said tumbler gear and laterally thereof while in mesh therewith, locking means for said tumbler idler gear to lock it in its rotative position and lateral position on said tumbler gear, means actuated by the inward movement of said actuating shaft for unlocking said locking means, said locking means having cam surfaces for moving said tumbler idler gear rotatably about the tumbler gear as it is shifted laterally thereon, means engaging said cam surfaces for so rotating said tumbler idler gear while laterally shifting the same, means controlled by the rotation of said actuating shaft for effecting said lateral shift of the tumbler idler gear, and means of actuating said locking means upon outward movement of said actuating shaft for causing said tumbler idler gear to engage with a change speed gear selected.

3. In a lathe gear box, change speed gearing for driving a mechanism in the gear box, a power gear, an idler gear in constant mesh with said power gear and adapted to selectively engage said change speed gearing, actuating means, a positive mechanical locking means for locking said idler gear in engagement with said change speed gearing, one means actuated by axial movement of said actuating means in one direction for unlocking said locking means, resilient means rendered active upon unlocking of said locking means for disengaging said idler gear from said change speed gearing, means actuated by rotation of said actuating means for causing said idler gear to traverse over said change speed gearing, and a second means actuated by axial movement of said actuating means in the opposite direction for overcoming the effect of said resilient means and urging said idler gear into reengagement with said change speed gearing.

4. In a lathe gear box, change speed gearing for driving a mechanism in the gear box, a power gear, an idler gear in constant mesh with said power gear and adapted to selectively engage said change speed gearing, a single rotatable and reciprocable actuating means, locking means for locking said idler gear in engagement with said change speed gearing, said locking means including resiliently operated means actuated by axial movement of said actuating means for unlocking said idler gear, resilient means for disengaging said idler gear from said change speed gearing when said locking means is unlocked, means actuated by rotation of said actuating means for causing said idler gear to traverse over change speed gearing, and means actuated by axial movement of said actuating means for operably overcoming the last mentioned resilient means for urging said idler gear into reengagement with said change speed gearing and simultaneously locking said locking means.

5. In a lathe gear box, change speed gearing for driving a mechanism, an elongated power driven gear, an idler gear supported by said power gear and in constant mesh therewith for selectively engaging said change speed gearing, a reciprocable and rotatable actuating means, locking means for positioning said idler gear in engagement with one of the gears of said change speed gearing and having a cam slot engaged by means extending from said idler gear for rotating said idler gear bodily about said power gear when said idler gear is moved axially upon said power gear, said cam slot being separable to unlock said idler gear, means resiliently actuated upon axial movement of said actuating means for unlocking said locking means by causing separation of said cam slot, resilient means urging said means extending from said idler gear into engagement with one side of said cam slot when separated, means actuated by rotation of said actuating means for moving said idler gear axially upon said power gear to traverse said change speed gearing and simultaneously produce rotation of said idler gear bodily about said power gear, and means actuated by axial movement of said actuating means for urging said idler gear into re-engagement with said change speed gearing and simultaneously lock the same in said position by closing said slot in said locking means.

6. In a lathe gear box, change speed gearing for driving the feed rod and lead screw of the lathe, an elongated power driven gear, an idler gear supported by said power gear in constant mesh therewith movable axially thereof and rotatable bodily thereabout and shiftable for selectively engaging said change speed gearing, and an actuating mechanism for so selectively shifting said idler gear consisting of; a cam plate having a stepped cam slot therein, a shifting member engaging said cam slot and operably connected to said idler gear for rotating the same bodily about said power gear upon release of said member by said slot, an axially movable and rotatable actuating means for releasing said shifting member from said slot and axially moving said idler gear upon said power gear, means for axially moving said actuating means for causing said slot to separate and release said shifting member, means retaining said shifting member in engagement with one side of said slot upon release thereof to rotate said idler gear about said power gear and disengage the same from said change speed gearing, and means for rotating said actuating means to cause axial shifting movement of idler gear on said power gear whereby to select engagement thereof with said change speed gearing, said shifting member engaging one side of said slot causing rotation of said idler gear about said power gear during said axial shifting thereof thereover.

7. In a lathe gear box, change speed gearing for driving the feed rod and lead screw of the lathe, an elongated power driven gear, an idler gear supported by said power gear in constant mesh therewith movable axially thereof and rotatable bodily thereabout and shiftable for selectively engaging said change speed gearing, and an actuating mechanism for so selectively shifting said idler gear consisting of; a cam plate having a stepped cam slot therein, a shifting member engaging said cam slot and operably connected to said idler gear for rotating the same bodily about said power gear upon release of said member by said slot, an axially movable and rotatable actuating means for releasing said shifting member from said slot and axially moving said idler gear upon said power gear, means for locking said actuating member in position to retain said slot in locking engagement with said shifting member, resilient means opposing the action of said locking means to release said slot from locking engagement upon said shifting member, and means for actuating said locking means to release said actuating member whereby said resilient means causes release of said shifting member, said shifting member engaging one side of said slot causing rotation of said idler gear about said power gear during said axial shifting thereof thereover.

8. In a lathe gear box, change speed gearing for driving the feed rod and lead screw of the lathe, an elongated power driven gear, an idler gear supported by said power gear in constant mesh therewith movable axially thereof and rotatable bodily thereabout and shiftable for selectively engaging said change speed gearing, and an actuating mechanism for so selectively shifting said idler gear consisting of; a cam plate having a stepped cam slot therein, a shifting member engaging said cam slot and operably connected to said idler gear for rotating the same bodily about said power gear upon release of said member by said slot, an axially movable and rotatable actuating means for releasing said shifting member from said slot and axially moving said idler gear upon said power gear, pinion means on said actuating member, rack means engaged by said pinion means and having arm means operably engaging said idler gear for axially shifting the same upon said power gear, means for locking said actuating member in position to retain said slot in locking engagement with said shifting member, resilient means opposing the action of said locking means to release said slot from locking engagement upon said shifting member, means for actuating said locking means to release said actuating member whereby said resilient means causes release of said shifting member, said shifting member engaging one side of said slot causing rotation of said idler gear about said power gear during said axial shifting thereof thereover, said means for actuating said locking means being rotatable and operably connected to said actuating means for rotating said pinion carried thereby to axially move said idler gear over said power gear.

9. In a lathe gear box, change speed gearing for driving the feed rod and lead screw of the lathe, an elongated power driven gear, an idler gear supported by said power gear in constant mesh therewith movable axially thereof and rotatable bodily thereabout and shiftable for selectively engaging said change speed gearing, and an actuating mechanism for so selectively shifting said idler gear consisting of; a cam plate having a stepped cam slot therein, a shifting member engaging said cam slot and operably connected to said idler gear for rotating the same bodily about said power gear upon release of said member by said slot, an axially movable and rotatable actuating means for releasing said shifting member from said slot and axially moving said idler gear upon said power gear, pinion means on said actuating member, rack means engaged by said pinion means and having arm means operably engaging said idler gear for axially shifting the same upon said power gear, means for locking said actuating member in position to retain said slot in locking engagement with said shifting member, resilient means opposing the action of said locking means to release said slot from locking engagement upon said shifting member, means for actuating said locking means to release said actuating member whereby said resilient means causes release of said shifting member, said shifting member engaging one side of said slot causing rotation of said idler gear about said power gear during said axial shifting thereof thereover, said means for actuating said locking means being rotatable and operably connected to said actuating means for rotating said pinion carried thereby to axially move said idler gear over said power gear, said last mentioned means being also axially movable, means operably connecting said last mentioned means with said actuating means whereby to axially move the same to close said slot, and resilient means for returning said locking means into locking engagement with said actuating means.

10. In a lathe gear box, change speed gearing for driving the feed rod and lead screw of the lathe, an elongated power driven gear, an idler gear supported by said power gear in constant mesh therewith movable axially thereof and rotatable bodily thereabout and shiftable for selectively engaging said change speed gearing, and an actuating mechanism for so selectively shifting said idler gear consisting of; a cam plate having a stepped cam slot therein, a shifting member engaging said cam slot and operably connected to said idler gear for rotating the same bodily about said power gear upon release of said member by said slot, an axially movable and rotatable actuating means for releasing said shifting member from said slot and axially moving said idler gear upon said power gear, means for locking said actuating member in position to retain said slot in locking engagement with said shifting member, resilient means opposing the action of said locking means to release said slot from locking engagement upon said shifting member, a second rotatable and axially movable actuating member, means on said second actuating member engaging said locking means to actuate the same in one direction of movement of said second actuating member, and means carried by said second actuating member operably engaging said first actuating means whereby to rotate the same upon rotation thereof to shift said idler gear.

11. In a lathe gear box, change speed gearing for driving the feed rod and lead screw of the lathe, an elongated power driven gear, an idler gear supported by said power gear in constant mesh therewith movable axially thereof and rotatable bodily thereabout and shiftable for selectively engaging said change speed gearing, and an actuating mechanism for so selectively shifting said idler gear consisting of; a cam plate having a stepped cam slot therein, a shifting member engaging said cam slot and operably connected to said idler gear for rotating the same bodily about said power gear upon release of said member by said slot, an axially movable and rotatable actuating means for releasing said shifting member from said slot and axially moving said idler gear upon said power gear, means for locking said actuating member in position to retain said slot in locking engagement with said shifting member, resilient means opposing the action of said locking means to release said slot from locking engagement upon said shifting member, a second rotatable and axially movable actuating member, means on said second actuating member engaging said locking means to actuate the same in one direction of movement of said second actuating member, means carried by said second actuating member operably engaging said first actuating means whereby to rotate the same upon rotation thereof to shift said idler gear, and means operably interconnecting said first and second actuating members whereby to axially move said first member to close said slot and cause engagement of said idler gear with said change speed gearing by axial movement of said second actuating member in a direction opposite to that which actuates said locking means.

CLIFFORD A. BICKEL.